United States Patent
Sonobe et al.

(10) Patent No.: US 11,302,923 B2
(45) Date of Patent: Apr. 12, 2022

(54) ADDITIVE FOR ELECTROCHEMICAL DEVICE, BINDER COMPOSITION FOR ELECTROCHEMICAL DEVICE, SLURRY COMPOSITION FOR ELECTROCHEMICAL DEVICE, ELECTRODE FOR ELECTROCHEMICAL DEVICE, AND ELECTROCHEMICAL DEVICE

(71) Applicant: ZEON CORPORATION, Tokyo (JP)

(72) Inventors: Kenya Sonobe, Tokyo (JP); Yasuhiro Isshiki, Tokyo (JP)

(73) Assignee: ZEON CORPORATION, Tokyo (JP)

(*) Notice: Subject to any disclaimer, the term of this patent is extended or adjusted under 35 U.S.C. 154(b) by 0 days.

(21) Appl. No.: 16/960,317

(22) PCT Filed: Jan. 10, 2019

(86) PCT No.: PCT/JP2019/000570
§ 371 (c)(1),
(2) Date: Jul. 7, 2020

(87) PCT Pub. No.: WO2019/150909
PCT Pub. Date: Aug. 8, 2019

(65) Prior Publication Data
US 2021/0057747 A1  Feb. 25, 2021

(30) Foreign Application Priority Data
Jan. 30, 2018 (JP) .............................. JP2018-013968

(51) Int. Cl.
*H01M 4/62* (2006.01)
*H01M 10/0525* (2010.01)
*H01G 11/38* (2013.01)
*H01M 4/88* (2006.01)

(52) U.S. Cl.
CPC ............ *H01M 4/621* (2013.01); *H01G 11/38* (2013.01); *H01M 4/8828* (2013.01); *H01M 10/0525* (2013.01)

(58) Field of Classification Search
CPC .... H01M 4/62; H01M 10/0525; H01G 11/38; C01B 31/04
See application file for complete search history.

(56) References Cited

U.S. PATENT DOCUMENTS

| 2013/0288117 A1* | 10/2013 | Kim ................. H01M 10/0525 429/211 |
| 2020/0020950 A1 | 1/2020 | Nakayama et al. |

FOREIGN PATENT DOCUMENTS

| JP | H 0896798 A | * 4/1996 | ............. C01B 31/04 |
| JP | 2001319658 A | 11/2001 | |
| JP | 2004235007 A | 8/2004 | |
| JP | 2012146590 A | 8/2012 | |
| JP | 2012204303 A | 10/2012 | |
| JP | 2013145763 A | 7/2013 | |
| JP | 2016181324 A | 10/2016 | |
| JP | 2017130274 A | 7/2017 | |
| KR | 1020150014800 A | 2/2015 | |
| WO | 2018179898 A1 | 10/2018 | |

OTHER PUBLICATIONS

Aug. 4, 2020, International Preliminary Report on Patentability issued in the International Patent Application No. PCT/JP2019/000570.
Mar. 19, 2019, International Search Report issued in the International Patent Application No. PCT/JP2019/000570.
Oct. 6, 2021, the Extended European Search Report issued by the European Patent Office in the corresponding European Patent Application No. 19747272.3.

* cited by examiner

Primary Examiner — Khanh T Nguyen
(74) Attorney, Agent, or Firm — Kenja IP Law PC

(57) ABSTRACT

Provided is an additive for an electrochemical device that can ensure a high level of safety of an electrochemical device. The additive for an electrochemical device is an additive for an electrochemical device that is used in an electrochemical device, for which a temperature at which a volume expansion ratio thereof reaches a factor of 2 or more is higher than 150° C. and lower than 400° C., and in which the content of (A) each element belonging to group 2 of the periodic table is less than 100 mass ppm, the content of (B) each element belonging to group 17 of the periodic table is less than 100 mass ppm, and the content of (C) each element among Cr, Mn, Fe, Co, Ni, Cu, and Zn is less than 5 mass ppm.

7 Claims, No Drawings

ADDITIVE FOR ELECTROCHEMICAL DEVICE, BINDER COMPOSITION FOR ELECTROCHEMICAL DEVICE, SLURRY COMPOSITION FOR ELECTROCHEMICAL DEVICE, ELECTRODE FOR ELECTROCHEMICAL DEVICE, AND ELECTROCHEMICAL DEVICE

TECHNICAL FIELD

The present disclosure relates to an additive for an electrochemical device, a binder composition for an electrochemical device, a slurry composition for an electrochemical device, an electrode for an electrochemical device, and an electrochemical device.

BACKGROUND

Electrochemical devices such as lithium ion secondary batteries, electric double-layer capacitors, and lithium ion capacitors have characteristics such as compact size, light weight, high energy-density, and the ability to be repeatedly charged and discharged, and are used in a wide range of applications. An electrochemical device typically includes a plurality of electrodes and a separator that isolates the electrodes from one another and prevents short-circuiting between the electrodes.

Attempts have been made to improve separators in order to prevent internal short-circuiting and ensure safety of electrochemical devices. For example, Patent Literature (PTL) 1 reports that safety of an electrochemical device can be increased by using a separator for an electrochemical device that includes a specific plurality of separator layers.

CITATION LIST

Patent Literature

PTL 1: JP2016-181324A

SUMMARY

Technical Problem

In recent years, the diversification of applications of electrochemical devices, for example, has led to the need for new techniques to inhibit thermal runaway such as abnormal heat release or ignition in electrochemical devices caused by short-circuiting between electrodes and to ensure an even higher level of safety of electrochemical devices.

Accordingly, an object of the present disclosure is to provide a means of advantageously solving the problem set forth above.

Solution to Problem

The inventors conducted diligent investigation with the aim of solving the problem set forth above. The inventors found that by using an additive for an electrochemical device for which the temperature at which a volume expansion ratio thereof reaches a factor of 2 or more is within a specific range and in which the content of (A) each element belonging to group 2 of the periodic table, the content of (B) each element belonging to group 17 of the periodic table, and the content of (C) each element among Cr, Mn, Fe, Co, Ni, Cu, and Zn are respectively less than specific values, it is possible to ensure a high level of safety of an electrochemical device that is produced using the additive for an electrochemical device. In this manner, the inventors completed the present disclosure.

Specifically, the present disclosure aims to advantageously solve the problem set forth above, and a presently disclosed additive for an electrochemical device is used in an electrochemical device, wherein a temperature at which a volume expansion ratio of the additive for an electrochemical device reaches a factor of 2 or more is higher than 150° C. and lower than 400° C., content of (A) each element belonging to group 2 of the periodic table is less than 100 mass ppm, content of (B) each element belonging to group 17 of the periodic table is less than 100 mass ppm, and content of (C) each element among Cr, Mn, Fe, Co, Ni, Cu, and Zn is less than 5 mass ppm. By using an additive for an electrochemical device for which the temperature at which a volume expansion ratio thereof reaches a factor of 2 or more is within a specific range and in which the content of (A) each element belonging to group 2 of the periodic table, the content of (B) each element belonging to group 17 of the periodic table, and the content of (C) each element among Cr, Mn, Fe, Co, Ni, Cu, and Zn are respectively less than specific values in this manner, it is possible to ensure a high level of safety of an electrochemical device that is produced using the additive for an electrochemical device.

Note that "the temperature at which a volume expansion ratio reaches a factor of 2 or more", "the content of each element belonging to group 2 of the periodic table", "the content of each element belonging to group 17 of the periodic table", and "the content of each element among Cr, Mn, Fe, Co, Ni, Cu, and Zn" referred to in the present disclosure can be measured by measurement methods described in the EXAMPLES section of the present specification.

The presently disclosed additive for an electrochemical device preferably has an average particle diameter D50 of more than 50 nm and less than 2 μm. When the average particle diameter D50 of the additive for an electrochemical device is more than 50 nm and less than 2 μm, peel strength of an electrode produced using the additive for an electrochemical device can be improved, rate characteristics of an electrochemical device including the electrode can be improved, and Joule heat release upon the occurrence of an internal short circuit of the electrochemical device can be inhibited.

The presently disclosed additive for an electrochemical device preferably comprises either or both of an azo compound and a melamine compound. When the additive for an electrochemical device includes either or both of an azo compound and a melamine compound, slurry stability of a slurry composition for an electrochemical device containing the additive for an electrochemical device can be improved, peel strength of an electrode produced using the additive for an electrochemical device can be improved, rate characteristics and high-temperature preservation characteristics of an electrochemical device including the electrode can be improved, and Joule heat release upon the occurrence of an internal short circuit of the electrochemical device can be inhibited.

Moreover, the present disclosure aims to advantageously solve the problem set forth above, and a presently disclosed binder composition for an electrochemical device comprises: any one of the additives for an electrochemical device set forth above; and a binding material. When a binder composition for an electrochemical device contains any one of the additives for an electrochemical device set forth above and a binding material in this manner, it is possible to ensure a high level of safety of an electrochemical device that is produced using the binder composition for an electrochemical device.

In the presently disclosed binder composition for an electrochemical device, the binding material preferably includes at least one functional group selected from a carboxyl group, a hydroxyl group, a cyano group, an amino group, an epoxy group, an oxazoline group, an isocyanate group, and a sulfo group. When a binding material including at least one functional group selected from a carboxyl group, a hydroxyl group, a cyano group, an amino group, an epoxy group, an oxazoline group, an isocyanate group, and a sulfo group is used in this manner, slurry stability of a slurry composition for an electrochemical device containing the additive for an electrochemical device can be improved, peel strength of an electrode produced using the additive for an electrochemical device can be improved, and rate characteristics of an electrochemical device including the electrode can be improved.

Furthermore, the present disclosure aims to advantageously solve the problem set forth above, and a presently disclosed slurry composition for an electrochemical device comprises: the binder composition for an electrochemical device set forth above; and an electrode active material. When a slurry composition for an electrochemical device contains the binder composition for an electrochemical device set forth above and an electrode active material in this manner, slurry stability of the slurry composition for an electrochemical device containing an additive for an electrochemical device can be improved, peel strength of an electrode produced using the additive for an electrochemical device can be improved, rate characteristics and high-temperature preservation characteristics of an electrochemical device including the electrode can be improved, and Joule heat release upon the occurrence of an internal short circuit of the electrochemical device can be inhibited.

Also, the present disclosure aims to advantageously solve the problem set forth above, and a presently disclosed electrode for an electrochemical device is formed using any one of the slurry compositions for an electrochemical device set forth above. When an electrode for an electrochemical device is formed using any one of the slurry compositions for an electrochemical device set forth above in this manner, slurry stability of the slurry composition for an electrochemical device can be improved, peel strength of the electrode produced using the slurry composition for an electrochemical device can be improved, and rate characteristics of an electrochemical device including the electrode can be improved.

Moreover, the present disclosure aims to advantageously solve the problem set forth above, and a presently disclosed electrochemical device comprises the electrode for an electrochemical device set forth above. When an electrochemical device includes the electrode for an electrochemical device set forth above in this manner, slurry stability of a slurry composition for an electrochemical device can be improved, peel strength of an electrode produced using the slurry composition for an electrochemical device can be improved, and rate characteristics of an electrochemical device including the electrode can be improved.

Advantageous Effect

According to the present disclosure, it is possible to provide an additive for an electrochemical device, a binder composition for an electrochemical device, a slurry composition for an electrochemical device, and an electrode for an electrochemical device that can ensure a high level of safety of an electrochemical device.

Moreover, according to the present disclosure, it is possible to provide an electrochemical device for which a high level of safety is ensured.

DETAILED DESCRIPTION

The following provides a detailed description of embodiments of the present disclosure.

The presently disclosed additive for an electrochemical device can be used as a material in production of a binder composition for an electrochemical device. Moreover, the presently disclosed binder composition for an electrochemical device is a binder composition that contains the presently disclosed additive for an electrochemical device. Furthermore, the presently disclosed slurry composition for an electrochemical device is a slurry composition that contains the presently disclosed binder composition for an electrochemical device. Also, the presently disclosed electrode for an electrochemical device is an electrode that is formed using the presently disclosed slurry composition for an electrochemical device. Moreover, the presently disclosed electrochemical device is an electrochemical device that includes the presently disclosed electrode for an electrochemical device.

(Additive for Electrochemical Device)

The presently disclosed additive (expandable particles) for an electrochemical device is not specifically limited so long as the temperature at which the volume expansion ratio thereof reaches a factor of 2 or more is within a specific range and so long as the content of (A) each element belonging to group 2 of the periodic table, the content of (B) each element belonging to group 17 of the periodic table, and the content of (C) each element among Cr, Mn, Fe, Co, Ni, Cu, and Zn are respectively less than specific values, and may, for example, be an azo compound, a melamine compound, expandable graphite (excluding active materials and conductive materials typically used in electrochemical devices), a nitroso compound, a hydrazine compound, or the like. Note that the additive (expandable particles) for an electrochemical device may be one type used individually or two or more types used in combination in a freely selected ratio.

Of these examples, azo compounds and melamine compounds are preferable in terms that they can improve slurry stability of a slurry composition for an electrochemical device containing the additive for an electrochemical device, improve peel strength of an electrode produced using the additive for an electrochemical device, improve rate characteristics and high-temperature preservation characteristics of an electrochemical device including the electrode, and inhibit Joule heat release upon the occurrence of an internal short circuit of the electrochemical device.

Note that the additive (expandable particles) for an electrochemical device bonds to a subsequently described binding material through interactions with functional groups of the binding material.

<Temperature at which Volume Expansion Ratio Reaches Factor of 2 or More>

The temperature at which the volume expansion ratio of the additive (expandable particles) for an electrochemical device reaches 2 or more is not specifically limited so long as it is higher than 150° C. and lower than 400° C. in air, but is preferably 180° C. or higher, and more preferably 200° C. or higher, and is preferably 397° C. or lower, and more preferably 395° C. or lower. When the temperature at which the volume expansion ratio of the additive (expandable particles) for an electrochemical device reaches a factor of 2 or more is within any of the ranges set forth above, it is possible to inhibit side reactions in production using the additive for an electrochemical device and to inhibit Joule heat release upon an internal short circuit of an obtained electrochemical device.

<Volume Expansion Ratio at Temperature of Higher than 150° C. and Lower than 400° C.>

The volume expansion ratio of the additive (expandable particles) for an electrochemical device at a temperature of higher than 150° C. and lower than 400° C. is not specifically limited so long as it is a factor of 2 or more, but is preferably a factor of 5 or more, more preferably a factor of 10 or more, and particularly preferably a factor of 20 or more, and is preferably a factor of 100 or less, more preferably a factor of 50 or less, and particularly preferably a factor of 30 or less. When the volume expansion ratio at a temperature of higher than 150° C. and lower than 400° C. is within any of the ranges set forth above, it is possible to inhibit Joule heat release upon an internal short circuit of an electrochemical device including an electrode produced using the additive for an electrochemical device and to inhibit device rupture caused by a sudden change in volume.

<Content of (A) Each Element Belonging to Group 2 of Periodic Table>

The content of (A) each element belonging to group 2 of the periodic table is not specifically limited so long as it is less than 100 mass ppm, but is preferably 60 mass ppm or less, more preferably less than 50 mass ppm, even more preferably less than 30 mass ppm, and particularly preferably less than 10 mass ppm, and is most preferably 1 mass ppm or less for all such elements. When the content of (A) each element belonging to group 2 of the periodic table is within any of the ranges set forth above, slurry stability of a slurry composition for an electrochemical device containing the additive for an electrochemical device can be improved, rate characteristics and high-temperature preservation characteristics of an electrochemical device including an electrode produced using the additive for an electrochemical device can be improved, and Joule heat release upon an internal short circuit of the electrochemical device can be inhibited.

Note that the phrase "each element belonging to group 2 of the periodic table" refers to each of the elements Be, Mg, Ca, Sr, Ba, and Ra.

<Content of (B) Each Element Belonging to Group 17 of Periodic Table>

The content of (B) each element belonging to group 17 of the periodic table is not specifically limited so long as it is less than 100 mass ppm, but is preferably less than 50 mass ppm, and more preferably less than 30 mass ppm, and is most preferably 1 mass ppm or less for all such elements. When the content of (B) each element belonging to group 17 of the periodic table is within any of the ranges set forth above, rate characteristics and high-temperature preservation characteristics of an electrochemical device including an electrode produced using the additive for an electrochemical device can be improved, and Joule heat release upon an internal short circuit of the electrochemical device can be inhibited.

Note that the phrase "each element belonging to group 17 of the periodic table" refers to each of the elements F, Cl, Br, I, At, and Ts.

<Content of (C) Each Element Among Cr, Mn, Fe, Co, Ni, Cu, and Zn>

The content of (C) each element among Cr, Mn, Fe, Co, Ni, Cu, and Zn is not specifically limited so long as it is less than 5 mass ppm, but is preferably less than 3 mass ppm, and more preferably less than 2 mass ppm. When the content of (C) each element among Cr, Mn, Fe, Co, Ni, Cu, and Zn is within any of the ranges set forth above, side reactions in an electrochemical device can be inhibited, rate characteristics and high-temperature preservation characteristics of an electrochemical device including an electrode produced using the additive for an electrochemical device can be improved, and Joule heat release upon an internal short circuit of the electrochemical device can be inhibited.

<Other Components>

There are cases in which an additive (expandable particles) for an electrochemical device such as described above is used in expansion molding or the like of a rubber or a resin. In such applications, the addition and compounding of other components such as dispersants, pulverization aids, and plasticizers in order to improve dispersibility in the rubber or resin and for refinement in a production process is known in the art. Examples of such other components include calcium stearate, aluminum stearate, silica fine particles, calcium carbonate fine particles, and talc fine particles.

In the present disclosure, addition and compounding of other components such as described above may cause loss of chemical stability of an electrochemical device, and may lead to the loss of rate characteristics, for example. Moreover, in a case in which stability of a slurry is lost during production of an electrode, this may lead to the occurrence of an internal short circuit. For these reasons, the total content of such other components relative to the presently disclosed additive for an electrochemical device is preferably 5 mass % or less, more preferably 1 mass % or less, even more preferably 0.5 mass % or less, and most preferably 0.1 mass % or less. The content can be measured by typical quantitative analytical means such as ICP mass emission spectrometry and organic matter quantitative analysis by extraction.

<Azo Compound>

Examples of the azo compound include, but are not specifically limited to, azodicarbonamide (ADCA), dinitrosopentamethylenetetramine (DPT), and hydrazinecarbonamide (HDCA). One of these azo compounds may be used individually, or two or more of these azo compounds may be used in combination in a freely selected ratio.

Of these azo compounds, azodicarbonamide (ADCA) is preferable from a viewpoint of electrochemical stability.

<Melamine Compound>

Examples of the melamine compound include melamine, derivatives of melamine, and salts of melamine and derivatives thereof.

Melamine and derivatives of melamine include, for example, a compound represented by the following formula (I).

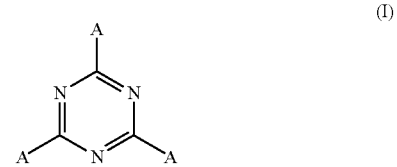

(I)

In formula (I), each A represents, independently of one another, a hydroxyl group or —NR$^1$R$^2$ (R$^1$ and R$^2$ each represent, independently of one another, a hydrogen atom, a hydrocarbon group, or a hydroxyl group-containing hydrocarbon group; when more than one $R^1$ is present in formula (I), each $R^1$ may be the same or different; and when more than one $R^2$ is present in formula (I), each $R^2$ may be the same or different).

Note that the hydrocarbon group and the hydroxyl group-containing hydrocarbon group of $R^1$ and $R^2$ may include one oxygen atom (—O—) or two or more oxygen atoms (—O—) that are interposed between carbon atoms (however, when two or more oxygen atoms are interposed, these oxygen atoms are not adjacent to one another). The number of carbon atoms in the hydrocarbon group and the hydroxyl group-containing hydrocarbon group of $R^1$ and $R^2$ is not specifically limited but is preferably not less than 1 and not more than 5.

Moreover, examples of salts of melamine and derivatives of melamine include, but are not specifically limited to, sulfates and cyanurates.

One melamine compound may be used individually, or two or more melamine compounds may be used in combination in a freely selected ratio. Of these melamine compounds, melamine (temperature at which volume expansion ratio reaches factor of 2 or more: 200° C.), ammeline (temperature at which volume expansion ratio reaches factor of 2 or more: 420° C.), ammelide (temperature at which volume expansion ratio reaches factor of 2 or more: 450° C.), and salts thereof with cyanuric acid are preferable from a viewpoint of improving adhesiveness of an electrode mixed material layer for an electrochemical device and rate characteristics of an electrochemical device, with melamine and a salt of melamine with cyanuric acid (melamine cyanurate; temperature at which volume expansion ratio reaches factor of 2 or more: 393° C.) being more preferable.

The average particle diameter D50 of the additive (expandable particles) for an electrochemical device is preferably more than 50 nm, more preferably 100 nm or more, and particularly preferably 120 nm or more, and is preferably less than 2 μm, more preferably 1.9 μm or less, even more preferably 1.8 μm or less, further preferably 1.6 μm or less, even further preferably 1.5 μm or less, particularly preferably 1.2 μm or less, and most preferably 1.1 μm or less. When the average particle diameter D50 of the additive (expandable particles) for an electrochemical device is within any of the ranges set forth above, peel strength of an electrode produced using the additive for an electrochemical device can be improved, rate characteristics of an electrochemical device including the electrode can be improved, and Joule heat release upon the occurrence of an internal short circuit of the electrochemical device can be inhibited.

The proportion constituted by the additive (expandable particles) for an electrochemical device among all solid content in the subsequently described binder composition for an electrochemical device is preferably 0.1 mass % or more, more preferably 1 mass % or more, and particularly preferably 10 mass % or more, and is preferably 50 mass % or less, and more preferably 40 mass % or less. When the proportion in which the additive (expandable particles) for an electrochemical device is contained in the binder composition for an electrochemical device is within any of the ranges set forth above, a high level of safety of an electrochemical device can be adequately ensured while also improving adhesiveness of an electrode mixed material layer for an electrochemical device and a current collector, and improving rate characteristics of the electrochemical device.

<Production Method of Additive for Electrochemical Device>

The method by which the presently disclosed additive for an electrochemical device is produced may, for example, be a method in which the presently disclosed additive for an electrochemical device is obtained through pulverization and purification of a commercially available product (industrial product) of expandable particles (foaming agent).

<<Pulverization>>

Any typical pulverization method for particles and powders may be used as the pulverization method without any specific limitations. For example, a wet pulverization method, a dry pulverization method, or the like may be adopted. More specifically, a bead mill can be used in wet pulverization. This pulverization makes it possible to obtain an additive (expandable particles) for an electrochemical device having an average particle diameter D50 that is within a specific range.

<<Purification>>

Examples of purification methods that may be adopted include, but are not specifically limited to, a method in which mixing with water, filtration, and washing are performed repeatedly and a method in which the additive (expandable particles) for an electrochemical device is produced through dissolution in a solubilizing solvent, followed by recrystallization or precipitation. This purification makes it possible to obtain an additive (expandable particles) for an electrochemical device in which the content of (A) each element belonging to group 2 of the periodic table, the content of (B) each element belonging to group 17 of the periodic table, and the content of (C) each element among Cr, Mn, Fe, Co, Ni, Cu, and Zn are respectively less than specific values.

(Binder Composition for Electrochemical Device)

The presently disclosed binder composition for an electrochemical device contains the presently disclosed additive for an electrochemical device and a binding material, and optionally further contains other components and the like.

<Binding Material>

The binding material is a component that ensures adhesiveness between a current collector and an electrode mixed material layer for an electrochemical device formed using the presently disclosed binder composition for an electrochemical device and that can inhibit detachment of components such as the additive for an electrochemical device and a conductive material from the electrode mixed material layer for an electrochemical device. Moreover, the binding component forms interactions with the surface of the additive and has functions of inhibiting surface degradation and imparting dispersibility. Furthermore, the binding material may function as what is referred to as a thickener.

<<Functional Group of Binding Material>>

Examples of functional groups that can be included in a polymer serving as the binding material include, but are not specifically limited to, a carboxyl group, a hydroxyl group, a cyano group, an amino group, an epoxy group, an oxazoline group, an isocyanate group, and a sulfo group (hereinafter, these functional groups are also referred to collectively as "specific functional groups"). One of these functional groups may be used individually, or two or more of these functional groups may be used in combination in a freely selected ratio.

Of these functional groups, a carboxyl group, a hydroxyl group, a cyano group, an amino group, and a sulfo group are preferable from a viewpoint of surface protection and ensuring dispersibility of the additive (expandable particles) for an electrochemical device.

No specific limitations are placed on the method by which any of the specific functional groups described above is introduced into the polymer serving as the binding material. Although introduction of a specific functional group may be achieved by producing a polymer using a monomer including any of the specific functional groups described above (specific functional group-containing monomer) so as to obtain a polymer including a specific functional group-containing monomer unit or by terminal modifying any polymer to obtain a polymer including any of the specific functional groups described above at a terminal thereof, the former of these methods is preferable. In other words, the polymer serving as the binding material includes at least one among a carboxyl group-containing monomer unit, a hydroxyl group-containing monomer unit, a cyano group-containing monomer unit, an amino group-containing monomer unit, an epoxy group-containing monomer unit, an oxazoline group-containing monomer unit, an isocyanate group-containing monomer unit, and a sulfo group-containing monomer unit as a specific functional group-containing monomer unit, and preferably includes at least one among a carboxyl group-containing monomer unit, a hydroxyl group-containing monomer unit, a cyano group-containing monomer unit, an amino group-containing monomer unit, and a sulfo group-containing monomer unit as a specific functional group-containing monomer unit.

[Carboxyl Group-Containing Monomer Unit]

Examples of carboxyl group-containing monomers that can form a carboxyl group-containing monomer unit include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Moreover, an acid anhydride that produces a carboxyl group through hydrolysis can be used as a carboxyl group-containing monomer. Of these carboxyl group-containing monomers, acrylic acid and methacrylic acid are preferable. Note that one carboxyl group-containing monomer may be used individually, or two or more carboxyl group-containing monomers may be used in combination in a freely selected ratio.

[Hydroxyl Group-Containing Monomer Unit]

Examples of hydroxyl group-containing monomers that can form a hydroxyl group-containing monomer unit include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR_a—COO—(C_qH_{2q}O)_p—H$ (where p represents an integer of 2 to 9, q represents an integer of 2 to 4, and Ra represents a hydrogen atom or a methyl group); mono(meth) acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether;

mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; (meth) allyl thioethers of alkylene glycols such as (meth)allyl-2-hydroxyethyl thioether and (meth)allyl-2-hydroxypropyl thioether; and hydroxyl group-containing amides such as N-hydroxymethylacrylamide (N-methylolacrylamide), N-hydroxymethylmethacrylamide, N-hydroxyethylacrylamide, and N-hydroxyethylmethacrylamide. Note that one hydroxyl group-containing monomer may be used individually, or two or more hydroxyl group-containing monomers may be used in combination in a freely selected ratio.

In the present disclosure, "(meth)allyl" is used to indicate "allyl" and/or "methallyl", and "(meth)acryloyl" is used to indicate "acryloyl" and/or "methacryloyl".

[Cyano Group-Containing Monomer Unit]

Examples of cyano group-containing monomers that can form a cyano group-containing monomer unit include α,β-ethylenically unsaturated nitrile monomers. Specifically, any α,β-ethylenically unsaturated compound that includes a cyano group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Note that one cyano group-containing monomer may be used individually, or two or more cyano group-containing monomers may be used in combination in a freely selected ratio.

[Amino Group-Containing Monomer Unit]

Examples of amino group-containing monomers that can form an amino group-containing monomer unit include dimethylaminoethyl (meth)acrylate, diethylaminoethyl (meth)acrylate, aminoethyl vinyl ether, and dimethylaminoethyl vinyl ether. Note that one amino group-containing monomer may be used individually, or two or more amino group-containing monomers may be used in combination in a freely selected ratio.

Moreover, in the present disclosure, "(meth)acrylate" is used to indicate "acrylate" and/or "methacrylate".

[Epoxy Group-Containing Monomer Unit]

Examples of epoxy group-containing monomers that can form an epoxy group-containing monomer unit include monomers that include a carbon-carbon double bond and an epoxy group.

Examples of monomers that include a carbon-carbon double bond and an epoxy group include unsaturated glycidyl ethers such as vinyl glycidyl ether, allyl glycidyl ether, butenyl glycidyl ether, and o-allylphenyl glycidyl ether;

monoepoxides of dienes and polyenes such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid. Note that one epoxy group-containing monomer may be used individually, or two or more epoxy group-containing monomers may be used in combination in a freely selected ratio.

[Oxazoline Group-Containing Monomer Unit]

Examples of oxazoline group-containing monomers that can form an oxazoline group-containing monomer unit include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline. Note that one oxazoline group-containing monomer may be used individually, or two or more oxazoline group-containing monomers may be used in combination in a freely selected ratio.

[Isocyanate Group-Containing Monomer Unit]

Examples of isocyanate group-containing monomers that can form an isocyanate group-containing monomer unit include 2-isocyanatoethyl methacrylate, 2-isocyanatoethyl acrylate, 2-(0-[1'-methylpropylideneamino]carboxyamino) ethyl methacrylate, 2-[(3,5-dimethylpyrazolyl)carbonylamino]ethyl methacrylate, and 1,1-(bisacryloyloxymethyl)ethyl isocyanate. Note that one isocyanate group-containing monomer may be used individually, or two or more isocyanate group-containing monomers may be used in combination in a freely selected ratio.

[Sulfo Group-Containing Monomer Unit]

Examples of sulfo group-containing monomers that can form a sulfo group-containing monomer unit include vinyl sulfonic acid, methyl vinyl sulfonic acid, (meth)allyl sulfonic acid, styrene sulfonic acid, (meth)acrylic acid 2-sulfoethyl, 2-acrylamido-2-methylpropane sulfonic acid, and 3-allyloxy-2-hydroxypropane sulfonic acid. Note that one sulfo group-containing monomer may be used individually, or two or more sulfo group-containing monomers may be used in combination in a freely selected ratio.

The proportion in which a specific functional group-containing monomer unit is included in the polymer serving as the binding material when the amount of all monomer units included in the polymer is taken to be 100 mass % is preferably 0.3 mass % or more, and more preferably 0.5 mass % or more, and is preferably 20 mass % or less, and more preferably 10 mass % or less. When the proportion in which a specific functional group-containing monomer unit is included in the polymer serving as the binding material is within any of the ranges set forth above, adhesiveness with a current collector and rate characteristics of an electrochemical device can be improved.

[Production Method of Binding Material]

No specific limitations are placed on the production method of the polymer serving as the binding material. The polymer serving as the binding material is produced by, for example, performing polymerization of a monomer composition containing the monomers described above in an aqueous solvent. The proportion in which each monomer is contained in the monomer composition can be set in accordance with the desired proportion of each monomer unit (repeating unit) in the polymer.

The polymerization method is not specifically limited, and any of solution polymerization, suspension polymerization, bulk polymerization, and emulsion polymerization can be used. Moreover, ionic polymerization, radical polymerization, living radical polymerization, various types of condensation polymerization, addition polymerization, or the like can be adopted as the polymerization reaction. Known emulsifiers and polymerization initiators can be used in the polymerization as necessary.

<<Type of Binding Material>>

The binding material is not specifically limited so long as it is a binding material that can be used inside an electrochemical device. For example, a polymer obtained through polymerization of a monomer composition containing a monomer that can display binding capacity (i.e., a synthetic macromolecule such as an addition polymer obtained through addition polymerization) can be used as the binding material. Examples of such polymers include a polymer including a cyano group-containing monomer unit (acrylonitrile unit) and an alkylene structural unit (hydrogenated 1,3-butadiene unit); a styrene-acrylonitrile-butadiene copolymer (butadiene units may be hydrogenated); an acrylonitrile-butadiene copolymer (butadiene units may be hydrogenated); a polyacrylonitrile (PAN) copolymer; polyvinylidene fluoride (PVDF); polyvinyl pyrrolidone; a styrene-2-ethylhexyl acrylate copolymer; and polybutyral. One of these polymers may be used individually, or two or more of these polymers may be used in combination in a freely selected ratio. From a viewpoint of electrochemical stability of the binding material and production of an electrode or the like of an electrochemical device, a polymer including a cyano group-containing monomer unit (acrylonitrile unit) and an alkylene structural unit (hydrogenated 1,3-butadiene unit); a styrene-acrylonitrile-butadiene copolymer (butadiene units may be hydrogenated); an acrylonitrile-butadiene copolymer (butadiene units may be hydrogenated); a polyacrylonitrile (PAN) copolymer; and polyvinylidene fluoride (PVDF) are preferable, a polymer including a cyano group-containing monomer unit (acrylonitrile unit) and an alkylene structural unit (hydrogenated 1,3-butadiene unit); a styrene-acrylonitrile-butadiene copolymer (butadiene units may be hydrogenated); an acrylonitrile-butadiene copolymer (butadiene units may be hydrogenated); and a polyacrylonitrile (PAN) copolymer are more preferable, and a polymer including a cyano group-containing monomer unit (acrylonitrile unit) and an alkylene structural unit (hydrogenated 1,3-butadiene unit); a styrene-acrylonitrile-butadiene copolymer (butadiene units include hydrogenated units); an acrylonitrile-butadiene copolymer (butadiene units may be hydrogenated); and a polyacrylonitrile (PAN) copolymer are most preferable.

Note that the phrase "includes a monomer unit" as used in the present disclosure means that "a polymer obtained using the monomer includes a repeating unit derived from the monomer".

[Proportional Content of Binding Material]

The proportion constituted by the binding material among all solid content in the binder composition for an electrochemical device is preferably 0.1 mass % or more, more preferably 2 mass % or more, even more preferably 10 mass % or more, and particularly preferably 20 mass % or more, and is preferably 80 mass % or less, more preferably 75 mass % or less, and particularly preferably 70 mass % or less. Adhesiveness to a current collector can be increased when the proportion in which the binding material is contained in the binder composition for an electrochemical device is 0.1 mass % or more, whereas rate characteristics of an electrochemical device can be improved when the proportion in which the binding material is contained in the binder composition for an electrochemical device is 80 mass % or less.

<<Other Components>>

No specific limitations are placed on other components that are optionally contained in the binder composition for an electrochemical device. For example, the binder composition for an electrochemical device may contain a dispersant or the like. The dispersant is a component that is compounded in order to improve dispersibility of a conductive material. The dispersant may, for example, be a non-ionic dispersant such as polyvinyl pyrrolidone or polyvinyl butyral, carboxymethyl cellulose, or the like.

Moreover, the binder composition for an electrochemical device may contain a flame retardant such as a phosphorus-based compound or a silicone-based compound from a viewpoint of improving safety of an electrochemical device. The content of the flame retardant described above can, for example, be set as 30 parts by mass or less or as 15 parts by mass or less per 100 parts by mass of the binding material.

One of these other components may be used individually, or two or more of these other components may be used in combination.

(Slurry Composition for Electrochemical Device)

The presently disclosed slurry composition for an electrochemical device contains the presently disclosed binder composition for an electrochemical device set forth above and optionally further contains an electrode active material, a conductive material, a solvent, and so forth.

<Electrode Active Material>

The electrode active material is a material that gives and receives electrons in an electrode of an electrochemical device. In a case in which the electrochemical device is a lithium ion secondary battery, for example, the electrode active material is normally a material that can occlude and release lithium.

Although the following describes, as one example, a case in which the slurry composition for an electrochemical device electrode is a slurry composition for a lithium ion secondary battery electrode, the presently disclosed slurry composition is not limited to the following example.

<<Positive Electrode Active Material>>

A positive electrode active material for a lithium ion secondary battery may, without any specific limitations, be a known positive electrode active material such as lithium-containing cobalt oxide ($LiCoO_2$), lithium manganate ($LiMn_2O_4$), lithium-containing nickel oxide ($LiNiO_2$), a lithium-containing complex oxide of Co—Ni—Mn (Li(CoMnNi)$O_2$) such as $LiNi_{0.5}Mn_{0.3}Co_{0.2}O_2$, a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), a $Li_2MnO_3$—$LiNiO_2$-based solid solution, a lithium-rich spinel compound represented by $Li_{1+x}Mn_{2-x}O_4$ (0<x<2), $Li[Ni_{0.17}Li_{0.2}Co_{0.07}Mn_{0.56}]O_2$, or $LiNi_{0.5}Mn_{1.5}O_4$.

The amount and particle diameter of the positive electrode active material are not specifically limited and may be the same as those of conventionally-used positive electrode active materials.

<<Negative Electrode Active Material>>

A negative electrode active material for a lithium ion secondary battery may, for example, be a carbon-based negative electrode active material, a metal-based negative electrode active material, or a negative electrode active material that is a combination thereof.

The amount and particle diameter of the negative electrode active material are not specifically limited and may be the same as those of conventionally-used negative electrode active materials.

[Carbon-Based Negative Electrode Active Material]

The carbon-based negative electrode active material can be defined as an active material that contains carbon as its main framework and into which lithium can be inserted (also referred to as "doping"). Examples of the carbon-based negative electrode active material include carbonaceous materials and graphitic materials.

[[Carbonaceous Material]]

Examples of carbonaceous materials include graphitizing carbon and non-graphitizing carbon, typified by glassy carbon, which has a structure similar to an amorphous structure.

The graphitizing carbon may be a carbon material made using tar pitch obtained from petroleum or coal as a raw material. Specific examples of graphitizing carbon include coke, mesocarbon microbeads (MCMB), mesophase pitch-based carbon fiber, and pyrolytic vapor-grown carbon fiber.

Examples of the non-graphitizing carbon include pyrolyzed phenolic resin, polyacrylonitrile-based carbon fiber, quasi-isotropic carbon, pyrolyzed furfuryl alcohol resin (PFA), and hard carbon.

[[Graphitic Material]]

Examples of graphitic materials include natural graphite and artificial graphite.

Examples of the artificial graphite include artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

[Metal-Based Negative Electrode Active Material]

The metal-based negative electrode active material is an active material that contains metal, the structure of which usually contains an element that allows insertion of lithium, and that has a theoretical electric capacity per unit mass of 500 mAh/g or more when lithium is inserted. Examples of the metal-based active material include lithium metal; a simple substance of metal that can form a lithium alloy (for example, Ag, Al, Ba, Bi, Cu, Ga, Ge, In, Ni, P, Pb, Sb, Si, Sn, Sr, Zn, or Ti); alloys of the simple substance of metal; and oxides, sulfides, nitrides, silicides, carbides, and phosphides of lithium metal, the simple substance of metal, and the alloys of the simple substance of metal. Of these metal-based negative electrode active materials, active materials containing silicon (silicon-based negative electrode active materials) are preferred. One reason for this is that the capacity of a lithium ion secondary battery can be increased through use of a silicon-based negative electrode active material.

[[Silicon-Based Negative Electrode Active Material]]

Examples of silicon-based negative electrode active materials include silicon (Si), a silicon-containing alloy, SiO, $SiO_x$, and a composite material of conductive carbon and a Si-containing material obtained by coating or combining the Si-containing material with the conductive carbon. One of these silicon-based negative electrode active materials may be used individually, or two or more of these silicon-based negative electrode active materials may be used in combination.

<Conductive Material>

The conductive material is a component that can form conduction paths in an electrode mixed material layer for an electrochemical device and that can ensure electrical continuity between a current collector and the electrode mixed material layer for an electrochemical device.

Although conductive carbon materials, fibers and foils of various metals, and so forth can be used as the conductive material without any specific limitations, conductive carbon materials are preferable. Examples of conductive carbon materials include carbon black (for example, acetylene black, Ketjenblack® (Ketjenblack is a registered trademark in Japan, other countries, or both), furnace black, etc.), single-walled and multi-walled carbon nanotubes (multi-walled carbon nanotubes are inclusive of cup-stacked carbon nanotubes), carbon nanohorns, vapor-grown carbon fiber, milled carbon fiber obtained through pyrolysis and subsequent pulverization of polymer fiber, single-layered and multi-layered graphene, and carbon non-woven fabric sheet obtained through pyrolysis of non-woven fabric made from polymer fiber. Note that one conductive material may be used individually, or two or more conductive materials may be used in combination in a freely selected ratio.

The proportion constituted by the conductive material among all solid content in the slurry composition for an electrochemical device is preferably 0.3 mass % or more, more preferably 0.5 mass % or more, and particularly preferably 1.0 mass % or more, and is preferably 10 mass % or less, more preferably 5 mass % or less, and even more preferably 3 mass % or less. Electrical continuity between a current collector and an electrode mixed material layer for an electrochemical device can be adequately ensured and rate characteristics of an electrochemical device can be enhanced when the proportion in which the conductive material is contained in the slurry composition for an electrochemical device is 0.3 mass % or more, whereas adhesiveness between a current collector and an electrode mixed material layer for an electrochemical device can be ensured when the proportion in which the conductive material is contained in the slurry composition for an electrochemical device is 10 mass % or less.

<Solvent>

Either of water or an organic solvent can be used without any specific limitations as the solvent used in the slurry composition for an electrochemical device. Examples of organic solvents that can be used include acetonitrile, N-methyl-2-pyrrolidone, tetrahydrofuran, acetone, acetylpyridine, cyclopentanone, dimethylformamide, dimethyl sulfoxide, methylformamide, methyl ethyl ketone, furfural, ethylenediamine, dimethylbenzene (xylene), methylbenzene (toluene), cyclopentyl methyl ether, and isopropyl alcohol.

One of these solvents can be used individually, or two or more of these solvents can be used as a mixture in a freely selected mixing ratio.

(Electrode for Electrochemical Device)

The presently disclosed electrode for an electrochemical device can be used as an electrode of an electrochemical device such as a lithium ion secondary battery, an electric double-layer capacitor, or a lithium ion capacitor.

The presently disclosed electrode for an electrochemical device is formed using the presently disclosed slurry composition for an electrochemical device. Specifically, the presently disclosed electrode for an electrochemical device may optionally include layers other than an electrode mixed material layer for an electrochemical device (for example, a current collector).

The presently disclosed electrode for an electrochemical device can impart a high level of safety to an electrochemical device that includes the presently disclosed electrode for an electrochemical device as a result of containing an additive for an electrochemical device for which the temperature at which a volume expansion ratio thereof reaches a factor of 2 or more is within a specific range and in which the content of (A) each element belonging to group 2 of the periodic table, the content of (B) each element belonging to group 17 of the periodic table, and the content of (C) each element among Cr, Mn, Fe, Co, Ni, Cu, and Zn are respectively less than specific values. The reason that a high level of safety of an electrochemical device can be ensured by using an electrode including an electrode mixed material layer for an electrochemical device that contains an additive for an electrochemical device for which the temperature at which a volume expansion ratio thereof reaches a factor of 2 or more is within a specific range and in which the content of (A) each element belonging to group 2 of the periodic table, the content of (B) each element belonging to group 17 of the periodic table, and the content of (C) each element among Cr, Mn, Fe, Co, Ni, Cu, and Zn are respectively less than specific values is presumed to be as follows. Firstly, in a situation in which a short-circuit occurs inside an electrochemical device due to contamination of the inside of the electrochemical device, a fault during electrode production, a mistake in electrochemical device design, or the like, the flow of current in a short-circuited part of the electrochemical device causes the release of Joule heat. Moreover, when this Joule heat causes dissolution of a separator and increased area of the short-circuited part, decomposition of electrolyte solution or the like inside the electrochemical device in which the temperature has further increased is thought to cause evolution of flammable gas that instigates abnormal heat release and ignition. As a result of the presently disclosed electrode for an electrochemical device containing the previously described additive for an electrochemical device in the electrode mixed material layer for an electrochemical device, the additive for an electrochemical device foams and releases non-flammable gas inside an electrochemical device having a raised temperature due to Joule heat. This evolution of non-flammable gas and expansion of volume of the additive are presumed to destroy the electrode structure and cut off conduction paths so as to inhibit the release of Joule heat and also to dilute flammable gas so as to slow the spread of fire.

<Current Collector>

A material having electrical conductivity and electrochemical durability can be selected as the current collector in accordance with the type of electrochemical device. For example, the current collector of an electrode for a lithium ion secondary battery can be a current collector made from iron, copper, aluminum, nickel, stainless steel, titanium, tantalum, gold, platinum, or the like. Of these materials, copper foil is particularly preferable as a current collector used for a negative electrode. On the other hand, aluminum foil is particularly preferable as a current collector used for a positive electrode. One of these materials may be used individually, or two or more of these materials may be used in combination in a freely selected ratio.

<Production Method of Electrode for Electrochemical Device>

The presently disclosed electrode for an electrochemical device is produced, for example, through a step of applying the presently disclosed slurry composition for an electrochemical device onto a current collector and drying the applied slurry composition for an electrochemical device to form an electrode mixed material layer for an electrochemical device (formation step of electrode mixed material layer for electrochemical device).

<<Formation Step of Electrode Mixed Material Layer for Electrochemical Device>>

Examples of methods by which the slurry composition for an electrochemical device can be applied onto the current collector include, but are not specifically limited to, doctor blading, reverse roll coating, direct roll coating, gravure coating, extrusion coating, and brush coating.

Moreover, the slurry composition for an electrochemical device that has been applied onto the current collector can be dried by any commonly known method without any specific limitations. Examples of drying methods that can be used include drying by warm, hot, or low-humidity air, drying in a vacuum, and drying through irradiation with infrared light, electron beams, or the like. The drying temperature is preferably not lower than 80° C. and not higher than 120° C., for example, from a viewpoint of inhibiting decomposition of a foaming agent contained in the slurry composition for an electrochemical device.

(Electrochemical Device)

The presently disclosed electrochemical device may be, but is not specifically limited to, a lithium ion secondary battery, an electric double-layer capacitor, or a lithium ion capacitor, and is preferably a lithium ion secondary battery. A feature of the presently disclosed electrochemical device is that it includes an electrode including an electrode mixed material layer for an electrochemical device that is formed using the presently disclosed slurry composition for an electrochemical device. As a result of the presently disclosed electrochemical device including an electrode that includes an electrode mixed material layer for an electrochemical device formed using the presently disclosed slurry composition for an electrochemical device, the presently disclosed electrochemical device inhibits thermal runaway and maintains a high level of safety.

Although the following describes, as one example, a case in which the electrochemical device is a lithium ion secondary battery, the presently disclosed electrochemical device is not limited to the following example. A lithium ion secondary battery corresponding to the presently disclosed electrochemical device normally includes electrodes (positive electrode and negative electrode), an electrolyte solution, and a separator, wherein an electrode mixed material layer for an electrochemical device containing the presently disclosed additive for an electrochemical device is included in at least one of the positive electrode, the negative electrode, and the separator.

<Electrodes>

Any known electrode can be used without any specific limitations as an electrode other than the electrode for an electrochemical device set forth above that can be used in the lithium ion secondary battery corresponding to the presently disclosed electrochemical device. Specifically, an electrode obtained by forming an electrode mixed material layer on a current collector by a known production method may be used as an electrode other than the electrode for an electrochemical device set forth above.

<<Electrode Mixed Material Layer>>

The electrode mixed material layer can, without any specific limitations, be an electrode mixed material layer containing an electrode active material and a binding material for an electrode mixed material layer, for example, that is selected in accordance with the type of electrochemical device. Note that the electrode active material (positive/negative electrode active material) and the binding material for an electrode mixed material layer (binding material for positive/negative electrode mixed material layer) in the electrode mixed material layer of the electrode for a lithium secondary battery can, for example, be known materials such as described in JP2013-145763A, for example.

<Separator>

The separator may be a separator such as described in JP2012-204303A, for example, but is not specifically limited thereto. Of these separators, a microporous membrane made of polyolefinic (polyethylene, polypropylene, polybutene, or polyvinyl chloride) resin is preferred since such a membrane can reduce the total thickness of the separator, which increases the ratio of electrode active material in the lithium ion secondary battery, and consequently increases the capacity per unit volume.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)_2NLi$. Of these lithium salts, $LiPF_6$, $LiClO_4$, and $CF_3SO_3Li$ are preferable as they readily dissolve in solvents and exhibit a high degree of dissociation. Note that one electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents in the case of a lithium ion secondary battery include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of these solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Lithium Ion Secondary Battery>

The lithium ion secondary battery in accordance with the present disclosure can be produced by, for example, stacking the positive electrode and the negative electrode with the separator in-between, performing rolling, folding, or the like of the resultant laminate, as necessary, to place the laminate in a battery container, injecting the electrolyte solution into the battery container, and sealing the battery container. Note that at least one of the positive electrode and the negative electrode is the presently disclosed electrode for an electrochemical device. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%", "ppm", and "parts" used to indicate quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

Furthermore, in the examples and comparative examples, "Measurement of temperature at which volume expansion ratio of additive (expandable particles) for electrochemical device reaches factor of 2 or more", "Measurement of volume expansion ratio (factor) at temperature of higher than 150° C. and lower than 400° C.", "Measurement of content of each element belonging to group 2 of periodic table in additive (expandable particles) for electrochemical device", "Measurement of content of each element belonging to group 17 of periodic table in additive (expandable particles) for electrochemical device", "Measurement of content of each element among Cr, Mn, Fe, Co, Ni, Cu, and Zn in additive (expandable particles) for electrochemical device", "Measurement of average particle diameter D50 of additive (expandable particles) for electrochemical device", "Test for Joule heat release upon internal short circuit of secondary battery", "Rate characteristics of secondary battery", "Slurry stability of slurry composition", "Peel strength of electrode", and "High-temperature storage characteristics (capacity maintenance rate) of secondary battery" were measured and evaluated by the following methods.

<Measurement of Temperature at which Volume Expansion Ratio of Additive (Expandable Particles) for Electrochemical Device Reaches Factor of 2 or More>

(1) Expandable particles were heated (20° C./min) by a heating-type plate in air and the temperature at which the volume expansion ratio of the additive (expandable particles) for an electrochemical device reached a factor of 2 was recorded using an optical microscope. Note that "the volume expansion ratio reaching a factor of 2" was taken to be "the diameter becoming +67% with the particle assumed to be a true circle". (2) Note that in the case of ADCA, MC, and NaHCO$_3$, gas evolution was taken to be included in the volume change thereof, and "the volume expansion ratio reaching a factor of 2" was taken to be "the weight loss (=amount of gas evolution) according to TGA exceeding 10%". The measurement results are shown in Table 1.

<Measurement of Volume Expansion Ratio (Factor) at Temperature of Higher than 150° C. and Lower than 400° C.>

Expandable particles were heated (20° C./min) using a heating-type plate in air and the volume expansion ratio (factor) of the additive (expandable particles) for an electrochemical device at a temperature of higher than 150° C. and lower than 400° C. was recorded using an optical microscope. The measurement results are shown in Table 1.

<Measurement of Content of Each Element Belonging to Group 2 of Periodic Table in Additive (Expandable Particles) for Electrochemical Device>

The content of each element belonging to group 2 of the periodic table in an additive (expandable particles) for an electrochemical device was measured using an ICP mass spectrometer (Agilent 8800 produced by Agilent Technologies, Inc.). The measurement results are shown in Table 1.

Note that in Example 1 and Comparative Example 1 in which azodicarbonamide (ADCA) was used as an additive for an electrochemical device, calcium was detected to be the element having the highest content among elements belonging to group 2 of the periodic table. Moreover, in Examples 2 to 6 and 8 in which melamine cyanurate (MC) was used as an additive for an electrochemical device, calcium was detected to be the element having the highest content among elements belonging to group 2 of the periodic table. Furthermore, in Example 7 in which expandable graphite was used as an additive for an electrochemical device, calcium was detected to be the element having the highest content among elements belonging to group 2 of the periodic table. Also, in Comparative Example 2 in which sodium hydrogen carbonate was used as an additive for an electrochemical device, calcium was detected to be the element having the highest content among elements belonging to group 2 of the periodic table.

<Measurement of Content of Each Element Belonging to Group 17 of Periodic Table in Additive (Expandable Particles) for Electrochemical Device>

The content of each element belonging to group 17 of the periodic table in an additive (expandable particles) for an electrochemical device was measured using an ICP mass spectrometer (Agilent 8800 produced by Agilent Technologies, Inc.). The measurement results are shown in Table 1.

Note that in Example 1 and Comparative Example 1 in which azodicarbonamide (ADCA) was used as an additive for an electrochemical device, chlorine was detected to be the element having the largest content among elements belonging to group 17 of the periodic table. Moreover, in Examples 2 to 6 and 8 in which melamine cyanurate (MC) was used as an additive for an electrochemical device, chlorine was detected to be the element having the highest content among elements belonging to group 17 of the periodic table. Furthermore, in Example 7 in which expandable graphite was used as an additive for an electrochemical device, chlorine was detected to be the element having the highest content among elements belonging to group 17 of the periodic table. Also, in Comparative Example 2 in which sodium hydrogen carbonate was used as an additive for an electrochemical device, chlorine was detected to be the element having the highest content among elements belonging to group 17 of the periodic table.

<Measurement of Content of Each Element Among Cr, Mn, Fe, Co, Ni, Cu, and Zn in Additive (Expandable Particles) for Electrochemical Device>

The content of each element among Cr, Mn, Fe, Co, Ni, Cu, and Zn in an additive (expandable particles) for an electrochemical device was measured using an ICP mass spectrometer (Agilent 8800 produced by Agilent Technologies, Inc.). The measurement results are shown in Table 1.

Note that in Example 1 and Comparative Example 1 in which azodicarbonamide (ADCA) was used as an additive for an electrochemical device, Fe was detected to be the element having the largest content among the elements Cr, Mn, Fe, Co, Ni, Cu, and Zn. Moreover, in Examples 2 to 6 and 8 in which melamine cyanurate (MC) was used as an additive for an electrochemical device, Fe was detected to be the element having the highest content among the elements Cr, Mn, Fe, Co, Ni, Cu, and Zn. Furthermore, in Example 7 in which expandable graphite was used as an additive for an electrochemical device, Fe was detected to be the element having the highest content among the elements Cr, Mn, Fe, Co, Ni, Cu, and Zn. Also, in Comparative Example 2 in which sodium hydrogen carbonate was used as an additive for an electrochemical device, Fe was detected to be the element having the highest content among the elements Cr, Mn, Fe, Co, Ni, Cu, and Zn.

<Measurement of Average Particle Diameter D50 of Additive (Expandable Particles) for Electrochemical Device>

The average particle diameter D50 of an additive (expandable particles) for an electrochemical device was measured using a laser diffraction particle size distribution analyzer (SALD produced by Shimadzu Corporation). The measurement results are shown in Table 1.

<Test for Joule Heat Release Upon Internal Short Circuit of Secondary Battery (Internal Short Circuit Test)>

A heat-resistant separator (substrate: polypropylene; heat-resistant layer thickness: 4 µm; including a 1 mm square hole) was sandwiched between a positive electrode and a negative electrode (each equipped with a tag), and these members were then sealed in an aluminum pouch to produce a cell. A circular tube (SUS) of 8 mm in diameter was used to apply 10 N of force to the part of the heat-resistant separator in the cell at which the hole had been formed so as to produce a forced internal short circuit part. The current and voltage were monitored while applying 10 V to the cell from a voltage-applying external power supply. The resistance was calculated from the voltage and the current, and the time until the resistance increased by a factor of 100 from straight after application of the voltage of 10 V was measured. An evaluation was made by the following standard. The evaluation results are shown in Table 1.

<<Evaluation Standard>>
A: Less than 5 s
B: Not less than 5 s and less than 10 s
C: Not less than 10 s and less than 15 s
D: 15 s or more <Rate Characteristics of Secondary Battery>

A lithium ion secondary battery produced in each example or comparative example was left at rest for 5 hours at a temperature of 25° C. after injection of electrolyte solution. Next, the lithium ion secondary battery was charged to a cell voltage of 3.65 V by a 0.2 C constant-current method at a temperature of 25° C., and was then subjected to 12 hours of aging at a temperature of 60° C. The lithium ion secondary battery was subsequently discharged to a cell voltage of 3.00 V by a 0.2 C constant-current method at a temperature of 25° C. Thereafter, CC-CV charging of the lithium ion secondary battery was performed with a 0.2 C constant current (upper limit cell voltage: 4.20 V) and CC discharging of the lithium ion secondary battery was performed to a cell voltage of 3.00 V with a 0.2 C constant current. This charging and discharging at 0.2 C was repeated three times.

Next, the lithium ion secondary battery was 0.2 C constant-current charged and discharged between cell voltages of 4.20 V and 3.00 V in an environment having a temperature of 25° C., and the discharge capacity at this time was defined as C0. Thereafter, the lithium ion secondary battery was CC-CV charged with a 0.2 C constant current in the same manner and was then discharged to 3.0 V with a 2.0 C constant current in an environment having a temperature of 25° C. The discharge capacity at this time was defined as C1. The rate of capacity change indicated by $\Delta C=(C1/C0)\times 100$ (%) was calculated as a rate characteristic and was evaluated by the following standard. The evaluation results are shown in Table 1. A larger value for the rate of capacity change $\Delta C$ indicates higher discharge capacity, lower internal resistance, and better rate characteristics.

<<Evaluation Standard>>
A: Rate of capacity change $\Delta C$ of 75% or more
B: Rate of capacity change $\Delta C$ of not less than 73% and less than 75%
C: Rate of capacity change $\Delta C$ of not less than 70% and less than 73%
D: Rate of capacity change $\Delta C$ of less than 70%

<Slurry Stability of Slurry Composition>

A produced slurry for an electrode was loaded into a plastic vessel (circular shape of 3 cm in diameter and 5 cm in height), was sealed therein, and was left at rest at room temperature of 25±2° C. The occurrence of active material sedimentation and gelation (loss of fluidity of slurry) were visually observed and examined by percussion. An evaluation was made by the following standard. The evaluation results are shown in Table 1.

<<Evaluation Standard>>
A: No sedimentation or gelation after 7 days
B: Sedimentation or gelation after 5 days
C: Sedimentation or gelation after 3 days
D: Sedimentation or gelation after 1 day <Peel Strength of Electrode>

A rectangle of 100 mm in length and 10 mm in width was cut out from a positive electrode for a lithium ion secondary battery produced in each example or comparative example as a test specimen. The test specimen was placed with the surface at which the electrode mixed material layer for an electrochemical device was located facing downward, and the surface at the side of the test specimen corresponding to the electrode mixed material layer for an electrochemical device was affixed to a test stage (SUS base plate) via cellophane tape (tape in accordance with JIS Z1522). Thereafter, the stress (N/m) when the current collector was peeled off by pulling one end of the current collector in a perpendicular direction at a pulling speed of 100 mm/min was measured (note that the cellophane tape was secured to the test stage). Three measurements were made in this manner. The average value of these measurements was determined as the peel strength of the electrode and was evaluated by the following standard. The evaluation results are shown in Table 1. A larger value for the peel strength of the electrode indicates better close adherence between the electrode mixed material layer for an electrochemical device and the current collector.

<<Evaluation Standard>>
A: Peel strength of 15 N/m or more
B: Peel strength of not less than 10 N/m and less than 15 N/m
C: Peel strength of not less than 5 N/m and less than 10 N/m
D: Peel strength of less than 5 N/m <High-Temperature Storage Characteristics (Capacity Maintenance Rate) of Secondary Battery>

A lithium ion secondary battery produced in each example or comparative example was left at rest for 5 hours at a temperature of 25° C. after injection of electrolyte solution. Next, the lithium ion secondary battery was charged to a cell voltage of 3.65 V by a 0.2 C constant-current method at a temperature of 25° C., and was then subjected to 12 hours of aging at a temperature of 60° C. The lithium ion secondary battery was subsequently discharged to a cell voltage of 3.00 V by a 0.2 C constant-current method at a temperature of 25°

C. Thereafter, CC-CV charging of the lithium ion secondary battery was performed by a 0.2 C constant-current method (upper limit cell voltage: 4.20 V) and CC discharging of the lithium ion secondary battery was performed to 3.00 V by a 0.2 C constant-current method. This charging and discharging at 0.2 C was repeated three times. The discharge capacity obtained at the end of the above was taken to be X1.

Thereafter, the lithium ion secondary battery was charged to a cell voltage of 4.20 V at 25° C. and was then left in this charged state for 2 weeks in an environment having a temperature of 60° C. The lithium ion secondary battery was subsequently discharged to a cell voltage of 3.00 V by a 0.2 C constant-current method at 25° C. The discharge capacity in the above was taken to be X2.

The rate of capacity change indicated by $\Delta C=(X2/X1)\times 100(\%)$ was calculated using the discharge capacity X1 and the discharge capacity X2 and was evaluated by the following standard. A larger value for the rate of capacity change $\Delta C$ indicates better high-temperature storage characteristics (capacity maintenance rate).

<<Evaluation Standard>>

A: $\Delta C$ of 85% or more
B: $\Delta C$ of not less than 83% and less than 85%
C: $\Delta C$ of not less than 80% and less than 83%
D: $\Delta C$ of less than 80%

Production Example 1: Production of Polymer A (Cyano Group-Containing Binding Material)

An autoclave equipped with a stirrer was charged with 240 parts of deionized water, 2.5 parts of sodium alkylbenzene sulfonate as an emulsifier, 34.0 parts of acrylonitrile as a cyano group-containing monomer, 2.2 parts of methacrylic acid, and 0.45 parts of t-dodecyl mercaptan as a chain transfer agent in this order, and the inside thereof was purged with nitrogen. Thereafter, 63.8 parts of 1,3-butadiene was injected as a conjugated diene monomer for introducing an alkylene structural unit into a polymer, 0.25 parts of ammonium persulfate was added as a polymerization initiator, and a polymerization reaction was carried out at a reaction temperature of 40° C. In this manner, a copolymer of acrylonitrile and 1,3-butadiene was obtained. The polymerization conversion rate was 85%.

Deionized water was added to the obtained copolymer to obtain a solution adjusted to a total solid content concentration of 12 mass %. Next, 400 mL of the obtained solution (total solid content: 48 g) was loaded into an autoclave of 1 L in capacity that was equipped with a stirrer, and dissolved oxygen in the solution was removed by passing nitrogen gas for 10 minutes. Thereafter, 75 mg of palladium acetate as a hydrogenation reaction catalyst was dissolved in 180 mL of deionized water to which nitric acid had been added in an amount of 4 molar equivalents relative to the palladium (Pd), and the resultant solution was added into the autoclave. The system was purged twice with hydrogen gas, and then the contents of the autoclave were heated to 50° C. in a state in which the pressure was increased to 3 MPa with hydrogen gas, and a hydrogenation reaction (first stage hydrogenation reaction) was performed for 6 hours.

The autoclave was subsequently restored to atmospheric pressure, 25 mg of palladium acetate as a hydrogenation reaction catalyst was dissolved in 60 mL of deionized water to which nitric acid had been added in an amount of 4 molar equivalents relative to the Pd, and the resultant solution was added into the autoclave. The system was purged twice with hydrogen gas, and then the contents of the autoclave were heated to 50° C. in a state in which the pressure was increased to 3 MPa with hydrogen gas, and a hydrogenation reaction (second stage hydrogenation reaction) was performed for 6 hours.

Next, the contents of the autoclave were restored to room temperature and the system was converted to a nitrogen atmosphere. Thereafter, an evaporator was used to perform concentrating to a solid content concentration of 40% to yield a water dispersion of a polymer.

The obtained water dispersion of the polymer was added dropwise into methanol to cause coagulation, and then the coagulated material was vacuum dried at a temperature of 60° C. for 12 hours to yield a polymer A including a cyano group-containing monomer unit (acrylonitrile unit) and an alkylene structural unit (hydrogenated 1,3-butadiene unit).

Production Example 2: Production of Polymer B (Cyano Group-Containing Binding Material)

An autoclave equipped with a stirrer was charged with 240 parts of deionized water, 2.5 parts of sodium alkylbenzene sulfonate, 20 parts of acrylonitrile, 10 parts of styrene, and 5 parts of methacrylic acid in this order, and the inside of the bottle was purged with nitrogen. Thereafter, 65 parts of 1,3-butadiene was injected, 0.25 parts of ammonium persulfate was added, and a polymerization reaction was carried out at a reaction temperature of 40° C. This yielded a polymer including a nitrile group-containing polymerization unit, an aromatic vinyl polymerization unit, a hydrophilic group-containing polymerization unit, and a polymerization unit formable by a conjugated diene monomer. The polymerization conversion rate was 85% and the iodine value was 280 mg/100 mg.

Next, 400 mL of a solution (total solid content: 48 g) adjusted to a total solid content concentration of 12 mass % by adding water to the polymer was loaded into an autoclave of 1 L in capacity that was equipped with a stirrer, and dissolved oxygen in the solution was removed by passing nitrogen gas for 10 minutes. Thereafter, 75 mg of palladium acetate as a hydrogenation reaction catalyst was dissolved in 180 mL of deionized water to which nitric acid had been added in an amount of 4 molar equivalents relative to the Pd, and the resultant solution was added into the autoclave. The system was purged twice with hydrogen gas, and then the contents of the autoclave were heated to 50° C. in a state in which the pressure was increased to 3 MPa with hydrogen gas, and a hydrogenation reaction (referred to as a "first stage hydrogenation reaction") was performed for 6 hours. The iodine value of the polymer at this point was 45 mg/100 mg.

Next, the autoclave was restored to atmospheric pressure, 25 mg of palladium acetate as a hydrogenation reaction catalyst was dissolved in 60 mL of water to which nitric acid had been added in an amount of 4 molar equivalents relative to the Pd, and the resultant solution was added into the autoclave. The system was purged twice with hydrogen gas, and then the contents of the autoclave were heated to 50° C. in a state in which the pressure was increased to 3 MPa with hydrogen gas, and a hydrogenation reaction (referred to as a "second stage hydrogenation reaction") was performed for 6 hours.

The resultant water dispersion of a polymer was added dropwise into methanol to cause coagulation, and then the coagulated material was vacuum dried at a temperature of 60° C. for 12 hours to yield a polymer B including a cyano group-containing monomer unit (acrylonitrile unit) and an alkylene structural unit (hydrogenated 1,3-butadiene unit).

Production Example 3: Production of Polymer E (Cyano Group-Containing Binding Material)

A reactor A to which a mechanical stirrer and a condenser were attached was charged with 85 parts of deionized water and 0.2 parts of sodium dodecylbenzene sulfonate in a nitrogen atmosphere. These materials were subsequently heated to 55° C. under stirring, and 0.3 parts of potassium persulfate was added into the reactor A in the form of a 5.0% aqueous solution. Next, a vessel B that was separate to that described above and to which a mechanical stirrer was attached was charged with 94.0 parts of acrylonitrile as a cyano group-containing monomer, 1.0 parts of acrylamide as a basic group-containing monomer, 2.0 parts of acrylic acid as an acidic group-containing monomer, 3.0 parts of n-butyl acrylate as a (meth)acrylic acid ester monomer, 0.6 parts of sodium dodecylbenzene sulfonate, 0.035 parts of t-dodecyl mercaptan, 0.4 parts of polyoxyethylene lauryl ether, and 80 parts of deionized water in a nitrogen atmosphere, and these materials were stirred and emulsified to produce a monomer mixture. The monomer mixture was then added into the reactor A at a constant rate over 5 hours while in a stirred and emulsified state, and a reaction was carried out until the polymerization conversion rate reached 95% to yield a water dispersion of a polyacrylonitrile (PAN) copolymer including mainly an acrylonitrile unit (94 mass %). The obtained water dispersion of the polymer was added dropwise to methanol to cause coagulation, and then the coagulated material was vacuum dried at a temperature of 60° C. for 12 hours to obtain a polymer E. In addition, an appropriate amount of NMP was added to a portion of the obtained water dispersion of the PAN copolymer so as to obtain a mixture. Thereafter, water and excess NMP were removed from the mixture through vacuum distillation at 90° C. to yield an NMP solution (solid content concentration: 8%) of the PAN copolymer. The NMP solution had a viscosity of 5,750 mPa·s at 10 $s^{-1}$.

Production Example 4: Production of Additive A for Electrochemical Device (Azodicarbonamide (ADCA) Pulverized/Purified Product)

After adding 200 g of azodicarbonamide into 1 L of distilled water, mixing and stirring was performed at room temperature for 2 hours using a Three-One Motor (BL300 produced by SHINTO Scientific Co., Ltd.). Thereafter, filtration and washing were performed on a wire mesh. These operations were performed twice.

In addition, the washed material was washed twice in the same manner using 1 L of ethanol to perform purification.

Next, 175 g of the purified azodicarbonamide and 236 g of NMP were weighed out, and a preliminary dispersion liquid was produced using a Three-One Motor (BL300 produced by SHINTO Scientific Co., Ltd.).

A bead mill (LMZ-015 produced by Ashizawa Finetech Ltd.) was used to process 500 g of the produced preliminary dispersion liquid for 10 minutes with a bead diameter of 0.3 mm, a bead packing rate of 80%, and a circumferential speed of 12 m/s, and the processed product was used as an additive A for an electrochemical device.

Production Example 5: Production of Additive B for Electrochemical Device (Melamine Cyanurate (MC) Pulverized/Purified Product X)

An additive B for an electrochemical device (melamine cyanurate (MC) pulverized/purified product X) was produced by performing operations in the same manner as in Production Example 4 with the exception that azodicarbonamide in Production Example 4 was changed to melamine cyanurate.

Production Example 6: Production of Additive C for Electrochemical Device (Melamine Cyanurate (MC) Pulverized/Purified Product Y)

An additive C for an electrochemical device (melamine cyanurate (MC) pulverized/purified product Y) was produced by performing operations in the same manner as in Production Example 5 with the exception that the bead diameter of 0.3 mm in Production Example 5 was changed to a bead diameter of 0.2 mm.

Example 1

<Production of Slurry Composition for Electrochemical Device (Slurry Composition for Secondary Battery Positive Electrode)>

A slurry composition for an electrochemical device (slurry composition for secondary battery positive electrode) was obtained by adding 96 parts of an active material NMC532 based on a lithium complex oxide of Co—Ni—Mn (LiNi$_{0.5}$Mn$_{0.3}$Co$_{0.2}$O$_2$) as a positive electrode active material; 1 part of acetylene black (produced by Denka Company Limited; product name: HS-100) as a conductive material; and, as a binder composition, 0.5 parts (in terms of solid content) of "polymer A (cyano group-containing binding material)" produced according to Production Example 1 as a binding material (binder), 1.5 parts (in terms of solid content) of "polymer C (polyvinylidene fluoride (PVDF) as polymer not including specific functional group; produced by Kureha Corporation; product name: L #7208)" as a binding material (thickener), and 1 part (in terms of solid content) of "additive A for an electrochemical device (azodicarbonamide (ADCA) pulverized/purified product)" produced according to Production Example 4 into a planetary mixer, mixing these materials, gradually further adding N-methyl-2-pyrrolidone (NMP) as an organic solvent (dispersion medium), and performing stirred mixing at a temperature of 25±3° C. and a rotation speed of 25 rpm to achieve a viscosity of 3,600 mPa·s as measured by a B-type viscometer at 60 rpm (rotor M4) and 25±3° C. The obtained slurry composition for an electrochemical device (slurry composition for secondary battery positive electrode) was used to evaluate "Slurry stability of slurry composition for electrochemical device (slurry composition for secondary battery positive electrode)" by the previously described method. The result is shown in Table 1.

<Production of Positive Electrode>

The slurry composition for an electrochemical device (slurry composition for secondary battery positive electrode) obtained as described above was applied onto aluminum foil (current collector) of 20 μm in thickness by a comma coater such as to have a coating weight of 20±0.5 mg/cm$^2$.

The slurry composition for an electrochemical device (slurry composition for secondary battery positive electrode) on the aluminum foil was dried by conveying the aluminum foil inside a 90° C. oven for 2 minutes and inside a 120° C. oven for 2 minutes at a speed of 200 mm/min to obtain a positive electrode web including an electrode mixed material layer for an electrochemical device formed on the current collector.

The side of the produced positive electrode web corresponding to the electrode mixed material layer for an electrochemical device was subsequently roll pressed at a line pressure of 14 t (tons) in an environment having a temperature of 25±3° C. to obtain a positive electrode in which the density of the electrode mixed material layer for an electrochemical device was 3.20 g/cm$^3$. The obtained positive electrode was used to evaluate "Peel strength of electrode" by the previously described method. The result is shown in Table 1.

<Production of Binder Composition for Negative Electrode>

A 5 MPa pressure vessel equipped with a stirrer was charged with 65 parts of styrene as an aromatic vinyl monomer, 35 parts of 1,3-butadiene as an aliphatic conjugated diene monomer, 2 parts of itaconic acid as a carboxyl group-containing monomer, 1 part of 2-hydroxyethyl acrylate as a hydroxyl group-containing monomer, 0.3 parts of t-dodecyl mercaptan as a molecular weight modifier, 5 parts of sodium dodecylbenzene sulfonate as an emulsifier, 150 parts of deionized water as a solvent, and 1 part of potassium persulfate as a polymerization initiator. These materials were sufficiently stirred and were then heated to a temperature of 55° C. to initiate polymerization. The reaction was quenched by cooling at the point at which monomer consumption reached 95.0%. The water dispersion containing a polymer that was obtained in this manner was adjusted to pH 8 through addition of 5% sodium hydroxide aqueous solution. Thereafter, unreacted monomer was removed by thermal-vacuum distillation. Cooling was subsequently performed to a temperature of 30° C. or lower to obtain a water dispersion (binder composition for negative electrode) containing a binder for a negative electrode.

<Production of Slurry Composition for Negative Electrode>

A planetary mixer was charged with 48.75 parts of artificial graphite (theoretical capacity: 360 mAh/g) and 48.75 parts of natural graphite (theoretical capacity: 360 mAh/g) as a negative electrode active material and 1 part in terms of solid content of carboxymethyl cellulose as a thickener. These materials were diluted to a solid content concentration of 60% with deionized water and were then kneaded at a rotation speed of 45 rpm for 60 minutes. Thereafter, 1.5 parts in terms of solid content of the binder composition for a negative electrode mixed material layer obtained as described above was added and was kneaded therewith at a rotation speed of 40 rpm for 40 minutes. Deionized water was then added to adjust the viscosity to 3,000±500 mPa·s (measured by B-type viscometer at 25° C. and 60 rpm), and, in this manner, a slurry composition for a negative electrode was produced.

<Production of Negative Electrode>

The slurry composition for a negative electrode was applied onto the surface of copper foil (current collector) of 15 μm in thickness by a comma coater such as to have a coating weight of 11±0.5 mg/cm$^2$. Thereafter, the copper foil having the slurry composition for a negative electrode mixed material layer applied thereon was conveyed inside an 80° C. oven for 2 minutes and inside a 110° C. oven for 2 minutes at a speed of 400 mm/min to dry the slurry composition on the copper foil and thereby obtain a negative electrode web including a negative electrode mixed material layer formed on the current collector.

The negative electrode mixed material layer side of the produced negative electrode web was subsequently roll pressed at a line pressure of 11 t (tons) in an environment having a temperature of 25±3° C. to obtain a negative electrode in which the density of the negative electrode mixed material layer was 1.60 g/cm$^3$.

<Preparation of Separator for Secondary Battery>

A separator made from a single layer of polypropylene (produced by Celgard, LLC.; product name: #2500) was prepared.

<Production of Lithium Ion Secondary Battery>

A single-layer laminate cell (initial design discharge capacity: equivalent to 30 mAh) was produced using the positive electrode, negative electrode, and separator described above and was arranged inside aluminum packing. Thereafter, the aluminum packing was filled with an LiPF$_6$ solution of 1.0 M in concentration (solvent: mixed solvent of ethylene carbonate (EC)/diethyl carbonate (DEC)=5/5 (volume ratio); additive: containing 2 volume % (solvent ratio) of vinylene carbonate) as an electrolyte solution. The aluminum packing was then closed by heat sealing at a temperature of 150° C. to tightly seal an opening of the aluminum packing, and thereby produce a lithium ion secondary battery. The obtained electrochemical device (lithium ion secondary battery) was used to evaluate "Test for Joule heat release upon internal short circuit of secondary battery", "Rate characteristics of secondary battery", and "High-temperature storage characteristics (capacity maintenance rate) of secondary battery" by the previously described methods. The results are shown in Table 1.

Example 2

"Production of a slurry composition for an electrochemical device (slurry composition for secondary battery positive electrode)", "production of a positive electrode", "production of a binder composition for a negative electrode", "production of a slurry composition for a negative electrode", "production of a negative electrode", "preparation of a separator for a secondary battery", and "production of a lithium ion secondary battery" were carried out in the same way as in Example 1 with the exception that "additive B for an electrochemical device (melamine cyanurate (MC) pulverized/purified product X)" produced according to Production Example 5 was used instead of using "additive A for an electrochemical device (azodicarbonamide (ADCA) pulverized/purified product)" produced according to Production Example 4 in production of the slurry composition for an electrochemical device (slurry composition for secondary battery positive electrode) in Example 1. Evaluations were performed in the same manner as in Example 1. The results are shown in Table 1.

Example 3

"Production of a slurry composition for an electrochemical device (slurry composition for secondary battery positive electrode)", "production of a positive electrode", "production of a binder composition for a negative electrode", "production of a slurry composition for a negative electrode", "production of a negative electrode", "preparation of a separator for a secondary battery", and "production of a lithium ion secondary battery" were carried out in the same way as in Example 2 with the exception that "polymer B (cyano group-containing binding material)" produced according to Production Example 2 was used instead of using "polymer A (cyano group-containing binding material)" produced according to Production Example 1 in production of the slurry composition for an electrochemical device (slurry composition for secondary battery positive electrode) in Example 2. Evaluations were performed in the same manner as in Example 2.

The results are shown in Table 1.

Example 4

"Production of a slurry composition for an electrochemical device (slurry composition for secondary battery positive electrode)", "production of a positive electrode", "production of a binder composition for a negative electrode", "production of a slurry composition for a negative electrode", "production of a negative electrode", "preparation of a separator for a secondary battery", and "production of a lithium ion secondary battery" were carried out in the same way as in Example 2 with the exception that "polymer D (polyvinyl pyrrolidone as polymer not including specific functional group; produced by Wako Pure Chemical Industries, Ltd.; product name: K90)" was used instead of using "polymer A (cyano group-containing binding material)" produced according to Production Example 1 in production of the slurry composition for an electrochemical device (slurry composition for secondary battery positive electrode) in Example 2. Evaluations were performed in the same manner as in Example 2. The results are shown in Table 1.

Example 5

"Production of a slurry composition for an electrochemical device (slurry composition for secondary battery positive electrode)", "production of a positive electrode", "production of a binder composition for a negative electrode", "production of a slurry composition for a negative electrode", "production of a negative electrode", "preparation of a separator for a secondary battery", and "production of a lithium ion secondary battery" were carried out in the same way as in Example 1 with the exception that "additive C for an electrochemical device (melamine cyanurate (MC) pulverized/purified product Y)" produced according to Production Example 6 was used instead of using "additive A for an electrochemical device (azodicarbonamide (ADCA) pulverized/purified product)" produced according to Production Example 4 in production of the slurry composition for an electrochemical device (slurry composition for secondary battery positive electrode) in Example 1. Evaluations were performed in the same manner as in Example 1. The results are shown in Table 1.

Example 6

"Production of a slurry composition for an electrochemical device (slurry composition for secondary battery positive electrode)", "production of a positive electrode", "production of a binder composition for a negative electrode", "production of a slurry composition for a negative electrode", "production of a negative electrode", "preparation of a separator for a secondary battery", and "production of a lithium ion secondary battery" were carried out in the same way as in Example 5 with the exception that 0.5 parts (in terms of solid content) of "polymer B (cyano group-containing binding material)" produced according to Production Example 2 and 1.5 parts (in terms of solid content) of "polymer E (cyano group-containing binding material)" produced according to Production Example 3 were used instead of using 0.5 parts (in terms of solid content) of "polymer A (cyano group-containing binding material)" produced according to Production Example 1 and 1.5 parts (in terms of solid content) of "polymer C (PVDF as polymer not including specific functional group; produced by Kureha Corporation; product name: L #7208)" in production of the slurry composition for an electrochemical device (slurry composition for secondary battery positive electrode) in Example 5. Evaluations were performed in the same manner as in Example 5. The results are shown in Table 1.

Example 7

"Production of a slurry composition for an electrochemical device (slurry composition for secondary battery positive electrode)", "production of a positive electrode", "production of a binder composition for a negative electrode", "production of a slurry composition for a negative electrode", "production of a negative electrode", "preparation of a separator for a secondary battery", and "production of a lithium ion secondary battery" were carried out in the same way as in Example 1 with the exception that "additive D for an electrochemical device (expandable graphite)" was used instead of using "additive A for an electrochemical device (azodicarbonamide (ADCA) pulverized/purified product)" produced according to Production Example 4 in production of the slurry composition for an electrochemical device (slurry composition for secondary battery positive electrode) in Example 1. Evaluations were performed in the same manner as in Example 1. The results are shown in Table 1.

Example 8

"Production of a slurry composition for an electrochemical device (slurry composition for secondary battery positive electrode)", "production of a positive electrode", "production of a binder composition for a negative electrode", "production of a slurry composition for a negative electrode", "production of a negative electrode", "preparation of a separator for a secondary battery", and "production of a lithium ion secondary battery" were carried out in the same way as in Example 1 with the exception that "melamine cyanurate (MC) (produced by Nissan Chemical Industries, Ltd.; product name: MC-6000)" was used instead of using "additive A for an electrochemical device (azodicarbonamide (ADCA) pulverized/purified product)" produced according to Production Example 4 in production of the slurry composition for an electrochemical device (slurry composition for secondary battery positive electrode) in Example 1. Evaluations were performed in the same manner as in Example 1. The results are shown in Table 1.

Comparative Example 1

"Production of a slurry composition for an electrochemical device (slurry composition for secondary battery positive electrode)", "production of a positive electrode", "production of a binder composition for a negative electrode", "production of a slurry composition for a negative electrode", "production of a negative electrode", "preparation of a separator for a secondary battery", and "production of a lithium ion secondary battery" were carried out in the same way as in Example 1 with the exception that "azodicarbonamide (ADCA) (produced by Eiwa Chemical Ind. Co., Ltd.; product name: Vinyfor AC #3 C-K2)" was used instead of using "additive A for an electrochemical device (azodicarbonamide (ADCA) pulverized/purified product)" produced according to Production Example 4 in production of the slurry composition for an electrochemical device (slurry composition for secondary battery positive electrode) in Example 1. Evaluations were performed in the same manner as in Example 1. The results are shown in Table 1.

Comparative Example 2

"Production of a slurry composition for an electrochemical device (slurry composition for secondary battery positive electrode)", "production of a positive electrode", "production of a binder composition for a negative electrode", "production of a slurry composition for a negative electrode", "production of a negative electrode", "preparation of a separator for a secondary battery", and "production of a lithium ion secondary battery" were carried out in the same way as in Example 1 with the exception that sodium hydrogen carbonate (NaHCO$_3$) (reagent produced by Wako Pure Chemical Industries, Ltd.) was used instead of using "additive A for an electrochemical device (azodicarbonamide (ADCA) pulverized/purified product)" produced according to Production Example 4 in production of the slurry composition for an electrochemical device (slurry composition for secondary battery positive electrode) in Example 1. Evaluations were performed in the same manner as in Example 1. The results are shown in Table 1.

In Table 1, shown below:

"ADCA" indicates azodicarbonamide;

"MC" indicates melamine cyanurate;

"NaHCO$_3$" indicates sodium hydrogen carbonate; and

"NMC" indicates active material NMC532 based on lithium complex oxide of Co—Ni—Mn (LiNi$_{0.5}$Mn$_{0.3}$Co$_{0.2}$O$_2$) as positive electrode active material.

TABLE 1

| | | Example 1 | Example 2 | Example 3 | Example 4 | Example 5 | Example 6 |
|---|---|---|---|---|---|---|---|
| Additive (expandable particles) for electrochemical device | Temperature at which volume expansion ratio reaches factor of 2 or more (° C.) | 226 | 393 | 393 | 393 | 393 | 395 |
| | Volume expansion ratio at temperature of higher than 150° C. and fewer than 400° C. (factor) | ≥20 | ≥20 | ≥20 | ≥20 | ≥20 | ≥20 |
| | Content of (A) each element belonging to group 2 of periodic table | Maximum 10 mass ppm | All ≤1 mass ppm (≤detection limit) | All ≤1 mass ppm (≤detection limit) | All ≤1 mass ppm (≤detection limit) | All ≤1 mass ppm (≤detection limit) | All ≤1 mass ppm (≤detection limit) |
| | Content of (B) each element belonging to group 17 of periodic table | All ≤1 mass ppm (≤detection limit) | All ≤1 mass ppm (≤detection limit) | All ≤1 mass ppm (≤detection limit) | All ≤1 mass ppm (≤detection limit) | All ≤1 mass ppm (≤detection limit) | All ≤1 mass ppm (≤detection limit) |
| | Content of (C) each element among Cr, Mn, Fe, Co, Ni, Cu, and Zn | All ≤1 mass ppm (≤detection limit) | All ≤1 mass ppm (≤detection limit) | All ≤1 mass ppm (≤detection limit) | All ≤1 mass ppm (≤detection limit) | All ≤1 mass ppm (≤detection limit) | All ≤1 mass ppm (≤detection limit) |
| | Average particle diameter D50 (μm) | 1.8 | 1.6 | 1.6 | 1.6 | 1.1 | 1.1 |
| | Type | ADCA pulverized/ purified product | MC pulverized/ purified product X | MC pulverized/ purified product X | MC pulverized/ purified product X | MC pulverized/ purified product Y | MC pulverized/ purified product Y |
| | Amount (parts) | 1 | 1 | 1 | 1 | 1 | 1 |
| Active material | Type | NMC | NMC | NMC | NMC | NMC | NMC |
| | Amount (parts) | 96 | 96 | 96 | 96 | 96 | 96 |
| Conductive material | Type | Acetylene black | Acetylene black | Acetylene black | Acetylene black | Acetylene black | Acetylene black |
| | Amount (parts) | 1 | 1 | 1 | 1 | 1 | 1 |
| Binding material (thickener) | Type | Polymer C | Polymer C | Polymer C | Polymer C | Polymer C | Polymer E |
| | Amount (parts) | 1.5 | 1.5 | 1.5 | 1.5 | 1.5 | 1.5 |
| Binding material (binder) | Type | Polymer A | Polymer A | Polymer B | Polymer D | Polymer A | Polymer B |
| | Amount (parts) | 0.5 | 0.5 | 0.5 | 0.5 | 0.5 | 0.5 |
| Evaluation | Internal short circuit test | B | B | B | B | A | A |
| | Rate characteristics | B | B | B | C | A | A |
| | Slurry stability | A | A | A | C | A | A |
| | Electrode peel strength | B | B | A | C | A | A |
| | High-temperature storage characteristics (capacity maintenance rate) | A | A | A | A | A | A |

TABLE 1-continued

| | | Example 7 | Example 8 | Comparative Example 1 | Comparative Example 2 |
|---|---|---|---|---|---|
| Additive (expandable particles) for electrochemical device | Temperature at which volume expansion ratio reaches factor of 2 or more (° C.) | 220 | 393 | 228 | 150 |
| | Volume expansion ratio at temperature of higher than 150° C. and fewer than 400° C. (factor) | 5 | ≥20 | ≥20 | ≥20 |
| | Content of (A) each element belonging to group 2 of periodic table | Maximum 60 mass ppm | All ≤1 mass ppm (≤detection limit) | Maximum 11000 mass ppm | Maximum 5800 mass ppm |
| | Content of (B) each element belonging to group 17 of periodic table | All ≤1 mass ppm (≤detection limit) | All ≤1 mass ppm (≤detection limit) | All ≤1 mass ppm (≤detection limit) | Maximum 10 mass ppm |
| | Content of (C) each element among Cr, Mn, Fe, Co, Ni, Cu, and Zn | Maximum ≤5 mass ppm | All ≤1 mass ppm (≤detection limit) | Maximum 25 mass ppm | All ≤1 mass ppm (≤detection limit) |
| | Average particle diameter D50 (μm) | 1.9 | 2 | 5 | 10 |
| | Type | Expandable graphite | MC industrial product | ADCA industrial product | NaHCO$_3$ |
| | Amount (parts) | 1 | 1 | 1 | 1 |
| Active material | Type | NMC | NMC | NMC | NMC |
| | Amount (parts) | 96 | 96 | 96 | 96 |
| Conductive material | Type | Acetylene black | Acetylene black | Acetylene black | Acetylene black |
| | Amount (parts) | 1 | 1 | 1 | 1 |
| Binding material (thickener) | Type | Polymer C | Polymer C | Polymer C | Polymer C |
| | Amount (parts) | 1.5 | 1.5 | 1.5 | 1.5 |
| Binding material (binder) | Type | Polymer A | Polymer A | Polymer A | Polymer A |
| | Amount (parts) | 0.5 | 0.5 | 0.5 | 0.5 |
| Evaluation | Internal short circuit test | B | B | C | D |
| | Rate characteristics | B | C | C | D |
| | Slurry stability | B | C | C | D |
| | Electrode peel strength | B | C | C | D |
| | High-temperature storage characteristics (capacity maintenance rate) | B | B | D | D |

Note that in Table 1, "Maximum 10 ppm", for example, indicates that the maximum value of contents of elements is 10 ppm, whereas "All ≤1 ppm (≤ detection limit)" indicates that all elements are 1 ppm or less (detection limit or less).

It can be seen from Table 1 that in Examples 1 to 8 in which an additive for an electrochemical device was used for which the temperature at which a volume expansion ratio thereof reached a factor of 2 or more was within a specific range and in which content of (A) each element belonging to group 2 of the periodic table, content of (B) each element belonging to group 17 of the periodic table, and content of (C) each element among Cr, Mn, Fe, Co, Ni, Cu, and Zn were respectively less than specific values, it was possible to ensure a high level of safety of an electrochemical device (lithium ion secondary battery) (i.e., to inhibit Joule heat release upon an internal short circuit of the secondary battery and improve high-temperature storage characteristics (capacity maintenance rate) of the secondary battery) compared to Comparative Examples 1 and 2 in which such an additive for an electrochemical device was not used.

INDUSTRIAL APPLICABILITY

According to the present disclosure, it is possible to provide an additive for an electrochemical device, a binder composition for an electrochemical device, a slurry composition for an electrochemical device, and an electrode for an electrochemical device that can ensure a high level of safety of an electrochemical device.

Moreover, according to the present disclosure, it is possible to provide an electrochemical device for which a high level of safety is ensured.

The invention claimed is:

1. An additive for an electrochemical device used in an electrochemical device comprising either or both of an azo compound and a melamine compound, wherein
 a temperature at which a volume expansion ratio of the additive for an electrochemical device reaches a factor of 2 or more is higher than 150° C. and lower than 400° C.,
 content of (A) each element belonging to group 2 of the periodic table is less than 100 mass ppm,
 content of (B) each element belonging to group 17 of the periodic table is less than 100 mass ppm, and
 content of (C) each element among Cr, Mn, Fe, Co, Ni, Cu, and Zn is less than 5 mass ppm.

2. The additive for an electrochemical device according to claim 1, having an average particle diameter D50 of more than 50 nm and less than 2 μm.

3. A binder composition for an electrochemical device comprising: the additive for an electrochemical device according to claim 1; and a binding material.

4. The binder composition for an electrochemical device according to claim 3, wherein the binding material includes at least one functional group selected from a carboxyl group, a hydroxyl group, a cyano group, an amino group, an epoxy group, an oxazoline group, an isocyanate group, and a sulfo group.

5. A slurry composition for an electrochemical device comprising: the binder composition for an electrochemical device according to claim 3; and an electrode active material.

6. An electrode for an electrochemical device comprising an electrode mixed material layer for an electrochemical device formed using the slurry composition for an electrochemical device according to claim 5.

7. An electrochemical device comprising the electrode for an electrochemical device according to claim 6.

* * * * *